United States Patent Office 2,924,970
Patented Feb. 16, 1960

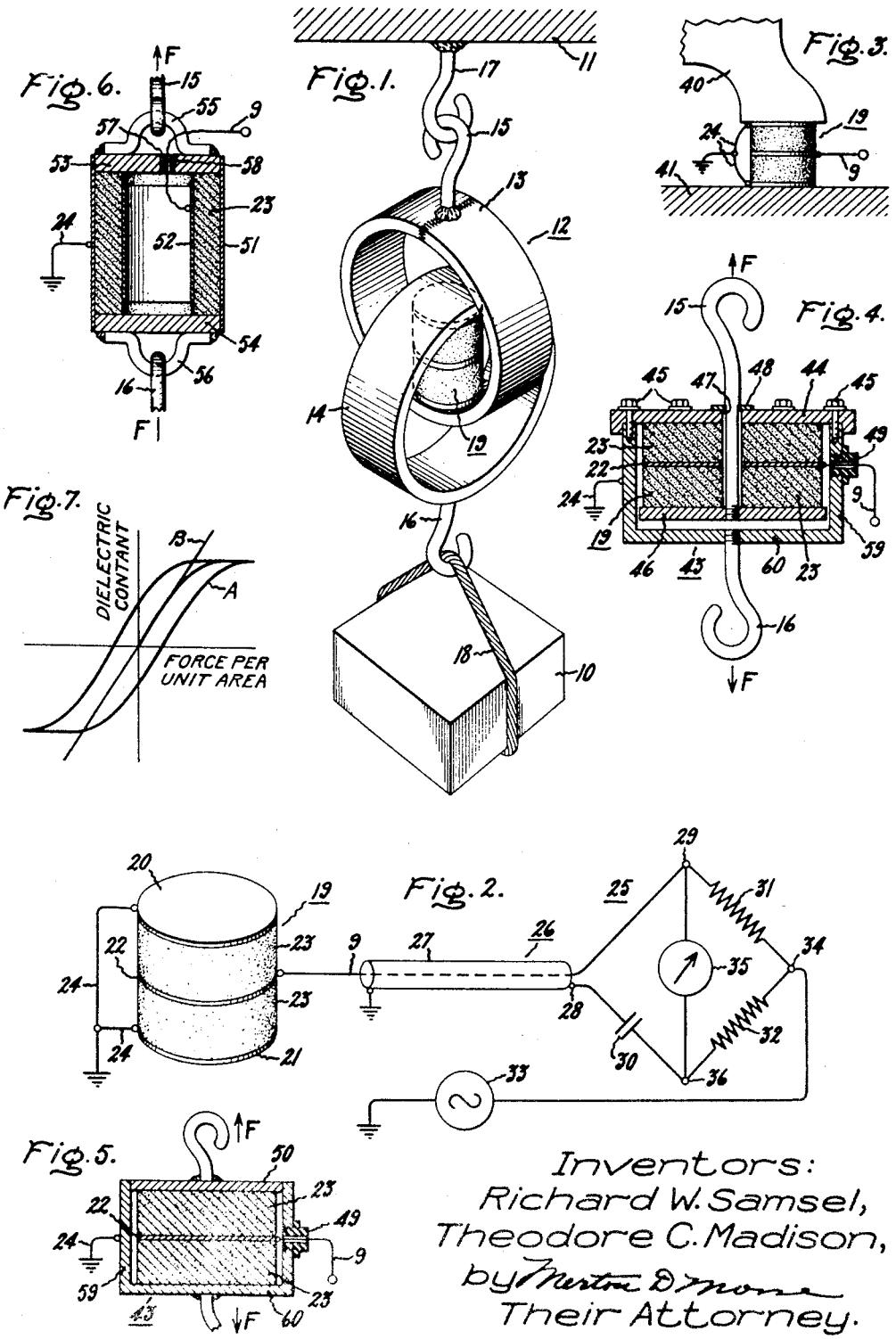

2,924,970

STATIC FORCE MEASUREMENT

Richard W. Samsel, Scotia, and Theodore C. Madison, Liverpool, N.Y., assignors to General Electric Company, a corporation of New York Application April 30, 1956, Serial No. 581,417

9 Claims. (Cl. 73—141)

This invention relates to static force measurement and, more particularly, to the measurement of static force utilizing the dielectric properties of the ferroelectric material lead metaniobate.

Wherever the term "lead metaniobate" is utilized in this application, it is used to include not only pure lead metaniobate but also lead metaniobate and its additives. For example, the term "lead metaniobate," as utilized herein, includes lead metaniobate with additives in solid solution therewith, and lead metaniobate with fluxing materials which are added to improve the ceramic properties of the material.

The ferroelectric ceramic material lead metaniobate is disclosed in the United States Patents 2,729,757, issued January 3, 1956, 2,731,419, issued January 17, 1956, and 2,805,165, issued September 3, 1957, to Mr. Gilbert Goodman, and asigned to the General Electric Company, assignee of the present invention.

Two general approaches have been followed in attempting to adapt ferroelectric and piezoelectric materials for static force measurement. The first and most common approach has been to utilize the piezoelectric properties of piezoelectric materials or activated ferroelectric materials such as barium titanate. The present application does not contemplate the use of piezoelectricity in any form. In fact, the lead metaniobate dielectric material utilized in force measuring apparatus disclosed herein does not have to be activated. If the lead metniobate ceramic is not activated, it does not display piezoelectric properties.

From the piezoelectric standpoint, the ferroelectric and piezoelectric materials have not generally been found practical as static force measuring devices, since the materials are not of a sufficiently high resistivity (volume or surface resistivity) and the resistivity of the circuits which are utilized with these materials is inherently too low. The practical result of these drawbacks is that the piezolectric charge quickly leaks off when measuring static force (or even variations in applied force at a relatively low frequency) making these devices virtually useless for this application.

The second general approach in adapting such materials for measurement of static force has been to utilize the piezocapacitive properties. When piezoelectric and ferroelectric materials are subjected to a physical stress, at least two things happen. First, the dielectric constant changes with the force applied. Secondly, the physical dimensions of the dielectrical material is changed. Thus, if the electrodes or plates of a capacitor are made to span the material and a force applied to the plates which will compress the dielectric material, the capacitance of the capacitor changes due to the change in dielectric constant of the material and also due to the physical reduction in the dimension between the plates. The combination of these two effects is known as piezocapacitive.

The fact that activated ferroelectric materials display piezocapacitive properties has been known for some time, but it is not believed that the fact that ferroelectric materials which have not been activated may display such propertiese in a sufficietnly large amount to be useful for static force measurements is known.

One of several reasons that the piezocapacitive properties of ferroelectric materials have not been generally used for the measurement of static forces is that what might best be considered piezocapacitive hysteresis is present in these materials in such large amounts as to make this application impractical. That is to say, that the dielectric constant of such materials does not vary linearly with an applied force per unit area, but gives a loop which resembles the hysteresis loop of magnetic materials. See, for example, Fig. 7 of the drawing wherein a typical piezocapacitive hysteresis loop (curve) is plotted with the dielectric constant of the material plotted along the axis of abscissas and an applied force per unit area along the axis of ordinates. In addition, piezoelectric potential differences occur between electrodes of capacitors having ferroelectric materials and piezoelectric crystals as dielectrics when force is applied. These potential differences interfere with the determination of the change in capacitance of the element.

It has been suggested that some of the difficulties mentioned above may be reduced by subjecting a capacitor, which consists of a composite of two slabs of ferroelectric material as the dielectric material to a bending, twisting, or torsion; i.e., to some type of moment or couple, and subjecting the dielectric material to a direct voltage bias. The direct voltage bias is used to render the element more sensitive and to make its response more linear. For this type of device, it is also suggested that an additional voltage be applied which is a function of the applied force to be measured to render the response still more nearly linear. The use of such expedients unduly complicate the device.

The problems mentioned above have virtually eliminated ferroelectric materials from competition with available static force measuring devices of other types. Aside from mechanical devices, such as spring scales, etc., resistance wire strain gages appear to be the most commonly used means of measuring such forces. Resistance wires gages suffer the disadvantage of having a dynamic range in the order of 1,000 to 1, which is rather small. That is to say, that the largest force responsive signal that can be handled by the device without damage is approximaely 1,000 times the smallest force responsive signal that can be discerned. The physical strength of the fine wire size which must be used ot obtain a desired impedance level and the limitation placed on the power level at which the gage may be operated with the fine wire size selected, combined with the relatively high noise level of a resistor and the change in resistance for a change in applied force, establish the dynamic range of the gage as a whole. The resistance of such a wire would be expected to increase in proportion to its length and further increase as its cross-sectional area is reduced. Both of these factors, of course, change with applied force. However, the resistance further increases with strain of the material itself by a factor of about two or three times that which may be predicted from the change of length and cross-section. This factor is termed the improvement factor.

A further disadvantage of the resistance wire type strain gage as a static force measuring means is its complexity. The complexity of such a device is also a result of the use of the fine wire to obtain a sufficiently high impedance to permit practical operation of the gage. Since the wire itself must be small, it cannot be used to support a large force directly but must be use as an indicator to support the force and provide structural strength.

Accordingly, it is an object of this invention to provide a static force measuring means having a sufficiently high impedance and elastic strength to be used simultaneously as the elastic force supporting member and as the force sensing element.

Another object of this invention is to provide force measuring means for converting or translating mechanical quantities such as force, deflection, displacement, velocity, acceleration, vibrations, and the like, into electrical quantities.

A further object of this invention is to provide a means of the character described which may be operated at a relatively high power level, having a high sensitivity, and a low noise level.

Briefly stated, in accordance with this invention, a static force measuring means is provided which utilizes lead metaniobate as an elastic structural force supporting member and as the force sensing element and determines the applied force by measuring the change in capacitance of the element due to the force applied.

It will be understood that mechanical linkages may be utilized to amplify or reduce the force applied to the force sensing element of this invention, and that bending moments may also be utilized to produce the change in capacitance to be measured. However, it is an advantage of the device disclosed herein that neither of these expedients is necessary for operation.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which Fig. 1 diagrammatically illustrates a ceramic in a force supporting system for determining the applied static force;

Fig. 2 illustrates diagrammatically a ceramic of the type illustrated in Fig. 1 connected in a circuit which may be utilized for determining the change in capacity due to an applied force;

Fig. 3 illustrates one application of a lead metaniobate force sensitive ceramic;

Figs. 4, 5, and 6 illustrate structures which may be employed to measure force utilizing lead metaniobate ceramic; and Fig. 7 illustrates a typical piezocapacitive hysteresis loop for a ferroelectric material as curve A and the straight line, curve B, obtained when plotting the dielectric constant against the force per unit area for lead metaniobate.

Referring specifically to Fig. 1 of the drawing, a force determining system which embodies the present invention is diagrammatically illustrated. It will be understood that the actual arrangement shown is not necessarily the arrangement to be used but is simply illustrative of one way to determine the force applied to the system by a suspended weight 10. As illustrated, the weight 10 is suspended from a structural member 11 by means of the force measuring apparatus 12 including a pair of cylindrical ring members 13 and 14 which are interlocked in a manner similar to the links of a chain. Each of the ring members 13 and 14 are provided with an eye hook 15 and 16 respectively for supporting the device and a weight 10 respectively. The upper hook 15 is connected to a corresponding eye hook 17 fastened to the structural member 11 and the eyehook 16 is connected to a weight holding cable 18 which holds the weight 10. A ceramic capacitance member 19 which is utilized as both a force supporting and force sensitive means is positioned between the inner faces of the interlocking ring members 13 and 14 in such a manner that it is directly compressed therebetween by the weight 10.

Thus, Fig. 1 illustrates the force supporting portion of the system and shows that the capacitive element 19 supports the weight or force directly and that no force proportioning devices are required. It is, of course, understood that the capacitive element 19 is preferably shielded, but the shielding is not shown in this figure so that a better view of the structure may be had.

The exact form of the capacitive element 19 utilized and illustrated in the embodiment of the invention illustrated in Fig. 1 may best be seen in Fig. 2 wherein the force measuring system is diagrammatically illustrated. From this figure, it may be seen that the capacitive element 19 utilized consists of two conducting outer electrodes 20 and 21 and a center or inner electrode 22 which is equidistance from the two outer electrodes 20 and 21. The space between the electrodes or plates 20, 21, and 22 is occupied by a ceramic dielectric material 23 known as lead metaniobate. In other words, the capacitive element 19 illustrated is a typical composite element having an intercalary electrode 22 located in the center of the dielectric material 23 and a pair of element spanning outer electrodes 20 and 21. The plates or electrodes 20, 21, and 22 are, of course, preferably of a metallic material.

It will, of course, be understood that the capacitive element utilized need not be a composite element but may be a simple capacitor. The lead metaniobate ceramic dielectric is important to this invention for the reason that this dielectric material is free from piezocapacitive hysteresis (see curve B of Fig. 7) which was previously thought to occur in all ferroelectric materials, has superior temperature stability, a sufficiently high impedance, and a sufficiently high structural strength so that it is practical to employ it simultaneously as the elastic structural member and as the force sensing element. Because the volume of the ceramic dielectric may be made very large, it may be operated at a high power level. Thus, a large amount of energy is available for conversion to an electrical signal which results in a low effective noise level. In addition, the noise level of a capacitor is inherently low. These properties, combined with the fact that its relative change in dielectric constant for a given applied force may be more than 100 times as large as the elastic strain compared to the 2 or 3 to 1 improvement factor (previously described) for resistance wire strain gages, make a capacitor with a lead metaniobate ceramic an ideal static force measuring device. In addition, the lead metaniobate ceramic may be operated at very high temperatures.

As illustrated in Fig. 2, the outer plate 20 and 21 of the capacitive element 19 are connected together and to ground by means of the leads 24, and the capacitive element 19 is connected in one ratio arm of a bridge circuit 25 by means of a coaxial cable 26. The bridge circuit 25 is provided with output terminals 29 and 36 and input terminals 28 and 34, a pair of resistors 31 and 32 connected in two adjacent brdige arms with one input terminal 34 at the junction therebetween, and a fixed capacitor 30 and the capacitive element 19 in the opposite two bridge arms. The outer sheath 27 of the cable is connected to ground and to one input terminal 28 of the bridge and the inner cable or conductor 9 is connected to the center plate 22 of the capacitive element 19 and the upper output terminal 29 of the capacitor bridge 25 so that the capacitive element is connected in the bridge circuit 25 as described above.

The bridge circuit 25 is energized from a source of alternating voltage 33 connected between the input terminals 28 and 34 and a measuring instrument, of meter 35, is connected directly between the output terminals 29 and 36 of the bridge to measure the output current flow and, consequently, indicate the capacitance of the capacitive element.

The simple capacitive bridge circuit 25 shown in Fig. 2 is utilized in what is known as DeSauty's method for comparing two condensers which is shown and described in a number of elementary textbooks such as "The Alternating Current Bridge Method" by B. Hague, Pittman Press, Great Britain, 1923, pages 194 through 196. In order to attain maximum sensitivity, the standard capacitor 30 should be made equal to the capacitance of the capacitive element 19 when it is unstressed and the resistor elements 31 and 32 should be non-inductive. It will, of course, be understood that this method of measuring the capacitance of the capacitive element is only one of many that could be employed. For example, any capacitance bridge circuit may be adapted for the application, or the capacitive element 19 could be used in the tuning circuit of an ordinary Hartley oscillator. Variations in the capacitance of the element 19, due to an applied force, would cause variations in frequency of oscillation of such an oscillator. The change in frequency could then be measured and utilized to indicate the force applied.

The capacitive element 19 is illustrated in the same form in Fig. 1, Fig. 2, and Fig. 3. It has been pointed out that it is desirable to shield the entire apparatus and that the various other constructions can be used. In Fig. 3, the capacitive element 19 is shown between the leg 40 of a machine and a floor or other structural member 41 for the purpose of measuring the force applied by the leg of the machine or determining the magnitude of mechanical vibrations. The outer plates of the capacitive element are connected together and to ground by leads 24, a lead 9 from the center plate of the capacitive element is provided which may be connected to the center conductor of a coaxial cable so that the capacitive element may be connected in a capacitance measuring circuit such as the bridge 25, illustrated in Fig. 2.

Figs. 4, 5, and 6 illustrate other devices which may be used with the capacitive element to make the force measurements and corresponding elements of these various devices are given the same reference numerals whereever possible for simplicity. Also, in each case leads 24 are provided for connecting the shields and hence the outer plates of the capacitive elements of the devices to ground potential. Leads 9 are provided in each of the devices to connect the inner plate 22 into a capacitance measuring circuit such as the bridge circuit 25, illustrated in Fig. 2.

The lead metaniobate ceramic dielectric 23 of the capacitive element 19, as illustrated in Fig. 4, is intended to be subjected to compressive forces when forces are applied to two suspending eye hooks or members 15 and 16 as indicated by the arrows F—F. The outer case 43 of the device illustrated in Fig. 4 acts as a container-shield member which is connected to ground potential by means of lead wire 24 and is intended to contain the capacitive element 19. The container-shield consists of a cylindrical side wall portion 59 and a bottom 60, which is illustrated as being integral with the side wall 59. In order to seal the shielding container, a top 44 is provided, adapted to be screwed down onto the container by means of holding screws 45, or it may be fixed to the container by any other suitable method. The top 44 of the container is either made the upper electrode for the capacitive element 19 or it is electrically coupled to such an electrode. The lower electrode 46 of the lead metaniobate ceramic is also made thick enough and strong enough to act as a force supporting member. The electrode 46 should also be stiff enough to distribute the appplied force uniformly over the entire lower face of the ceramic 23.

In order to place the ceramic dielectric 23 in compression when the device is subjected to a force, the weight supporting eye hook 16 is threaded into the bottom of the container 43 and the upper supporting eye hook 15 is passed down through an aperture in the top 44 of the container, through the entire capacitive element 19, and threaded into the lower electrode 46. A simple conducting ring seal 48 is provided around the aperture 47 in the top of the container to prevent contaminating matter from entering the container. Thus, it may be seen that if force is applied, as shown by the arrows F—F in Fig. 4, the lead metaniobate ceramic dielectric 23 is subjected to a compressive force between its lower electrode 46 and its upper electrode 44. A lead 9 is brought out from the center plate or electrode 22 through a sealing plug 49 which is threaded into one side of the shielding container 43 so that the capacitor 19 may be connected into a measuring circuit.

A similar arrangement is provided in Fig. 5. In this arrangement the dielectric 23 is subjected to tensive stresses by forces applied, as illustrated by the arrows F—F. The capactive element is again positioned in the shielding container 43. However, in this embodiment, dielectric material 23 is fixed to the bottom 60 of the shielding container 43 so that the bottom of the shielding container is made the lower electrode for the capacitive element 19 and the top 50 of the container 43 fits snugly inside the container in such a manner that it may be moved in the container but fits snugly enough to form a seal. The top 50 of the container 43 is fixed to the top of the dielectric material 23 and forms the upper electrode for the capacitive element 19. The shielding casing 43 is connected to ground potential by lead 24 and thus the upper and lower electrodes or plates of the capacitor are connected to ground potential. The center electrode, or plate 22, of the capacitive element is brought out of the container through a sealing plug 49 which is threaded into one side thereof by means of a lead 9 which may be utilized to connect the capacitive element 19 into a measuring circuit.

The arrangement of Fig. 6 shows the dielectric material 23 in the form of a hollow cylinder. An outer cylindrical shield 51 is electrically coupled to the outer surface of the ceramic 23 and acts both as a shield and an outer plate, and an inner cylindrical plate 52 is electrically coupled around the inner portion of the hollow cylinder and acts as an inner electrode. Thus, the capacitive element 19, as illustrated in Fig. 6, is actually in the form of a hollow cylinder with the outer plate 51 around the outer surface of the cylinder and the inner plate 52 spaced therefrom and around the inner surface of the cylinder. The dielectric ceramic lead metaniobate 23 is in the form of a hollow cylinder sandwiched between the two electrodes or plates 51 or 52. A pair of end plates 53 and 54 are fixed to opposite ends of the dielectric material and fit inside the outer cylindrical plate 52 in such a manner that they form a sealed container therewith. The outer electrode and shield 51 preferably make electrical contact with the two end plates 53 and 54, but the inner electrode 52 is electrically isolated therefrom. Stirrup shaped holders 55 and 56 respectively are secured to the end plates 53 and 54 for the purpose of holding supporting eye hooks 15 and 16 (broken away in this figure). Thus, when forces F—F are applied as illustrated, the ceramic dielectric 23 of the capacitor is subjected to tension and the capacitance between the inner and ouer electrodes 52 and 51 respectively is changed. Once again, the outer electrode 51 is connected to ground by means of a lead 24 and a lead is brought out from the inner cylindrical electrode 52 through an aperture 58 in the top of the container which is sealed by means of a sealing plug 57.

From the foregoing description, it will be appreciated that the objects of this invention have been carried out by providing a capacitive element having a dielectric of a ferroelectric material known as lead metaniobate wherein the capactive element may be utilized both as a force sensing means and a structural supporting element and the capacitive element may be operated at a high power level. It will also be appreciated the capacitive element provided is free from dielectric hysteresis and instability due to temperature changes.

While particular embodiments of this invention have been shown, it will, of course, be understood that the invention is not limited thereto since many modifications, both in the circuit arrangement and in the instrumentalities employed, may be made. It is contemplated that the appended claims will cover any such modifications as fall within the true spirit and scope of this invention.

What we claim as new and desire to secure by Letters Patent of the United States is:

1. A force responsive capacitance device comprising a body of lead metaniobate disposed between a pair of capacitance electrodes, means to subject said lead metaniobate to mechanical stress, said lead metaniobate having the property of producing substantial variation in capacity between said electrodes upon variation in said stress and of producing different values of capacity between said electrodes corresponding to different respective values of stress and independent of direction of variation in stress.

2. A force responsive capacitance device comprising a body of lead metaniobate disposed between capacitance electrodes, means to subject said lead metaniobate to stress, said lead metaniobate having the property of producing substantial variation in capacity between said electrodes upon variation in said stress, said variation being free of hysteresis effect whereby the capacity between said electrodes corresponds to the value of stress irrespective of prior stress to which said body was subjected.

3. In a force supporting and measuring device, a body of lead metaniobate having support members on either side thereof to support the entire force to be measured and to subject said body to said entire force, a pair of capacitance electrodes having said body therebetween, said body having the inherent property of varying the capacity between said capacitance electrodes in response to and in accord with varations of said force whereby the value of said capacitance is a measure of the magnitude of said force.

4. A force measuring device comprising a capacitive element having the configuration of a hollow right circular cylinder, said capacitive element having an inner and an outer conductive electrode of cylindrical shape separated by a pieoz-capacitive dielectric material, means to apply the force to be measured to said dielectric material in the direction parallel to the axis of said cylinder to thereby set up a stress therein, said material having the property that it varies the capacitance between said electrodes in accord with said force whereby a capacitance responsive measuring circuit coupled with said conductive electrodes to respond to the change of capacitance therebetween may measure said force.

5. In a force measuring device, a composite capacitive element having a dielectric of lead metaniobate, an intercalary electrode surrounded by said dielectric material on its two major surfaces, and a pair of outer electrodes which include said dielectric material and said intercalary electrode therebetween, at container-shield enclosing said dielectric material, means to apply the force to be measured to said composite capacitive element to thereby set up a stress in said dielectric material, said material having the property that it changes the capacitance between said intercalary electrode and said outer element in accord with said force whereby said force may be determined by measuring the capacity between said intercalary electrode and said outer electrodes.

6. In a force measuring device, a composite capacitive element having a dielectric of lead metaniobate, an intercalary electrode surrounded by said dielectric material on its two major surfaces and a pair of outer electrodes having said dielectric material and said intercalary electrode therebetween, a container-shield having a unitary cylindrical side wall and a bottom for receiving said composite capacitive element and a top for closing off said container, means to apply the force to be measured to said composite capacitive element to thereby set up a stress in said dielectric material, said material having the property of changing the capacity between said intercalary electrode and said outer electrodes in accord with said force whereby a capacitance responsive measuring circuit may be connected between said intercalary electrode and said outer electrodes to measure said applied force.

7. In a force measuring device, a composite capacitive element having a dielectric of lead metaniobate, an intercalary electrode surrounded by said dielectric material on its two major surfaces and a pair of outer electrodes which include said dielectric material and said intercalary electrode therebetween, a container-shield having a unitary cylindrical side wall and a bottom for receiving said composite capacitive element and a top for closing off said container, said top being positioned to close off said container and movable with respect thereto along the longitudinal axis thereof, said top and bottom of said container being in intimate contact with the major surfaces of said composite capacitive element, means to apply force to be measured between the top and bottom of said container to thereby set up a stress in said dielectric material, said material having the property of changing the capacity between said intercalary electrode and said outer electrodes in accord with said stress whereby a capacitance responsive measuring circuit electrically connected across said container to respond to said change of capacitance of said capacitive element due to the applied force may measure said force.

8. In a force measuring device, a composite capacitive element having a dielectric of lead metaniobate and an aperture therethrough along its longitudinal axis, an intercalary electrode surrounded by said dielectric material on its two major surfaces and a pair of outer electrodes which include said dielectric material and said intercalary electrode therebetween, a container-shield having a unitary cylindrical side wall and a bottom for receiving said composite capacitive element and a top for closing off said container, the upper surface of said capacitive element being in electrical contact with the top of said container, a force supporting member passing through the top of said container and the aperture through said composite capacitive element and fixed to the opposite outer electrode, and a second force supporting member fixed to the bottom of said container whereby a force between said force supporting member sets up a stress in said dielectric material, and a capacitance responsive measuring circuit connected between said container and said intercalary electrode to determine the change of capacitance of said composite capacitive element due to the application of force thereto.

9. In a stress measuring device a capacitor comprising a pair of capacitance electrodes having a dielectric therebetween of lead metaniobate, means to subject said lead metaniobate to stress to be measured, said lead metaniobate having the property that it varies the capacitance between said electrodes in response to and in accord with said stress whereby the magnitude of said stress may be determined by measuring said capacitance.

References Cited in the file of this patent

UNITED STATES PATENTS

| 2,053,560 | Jonovsky | Sept. 8, 1936 |
| 2,399,082 | Wainer | Apr. 23, 1946 |
| 2,596,361 | Blancher | May 13, 1952 |
| 2,614,416 | Hollman | Oct. 21, 1952 |
| 2,668,936 | Robinson | Feb. 9, 1954 |
| 2,711,498 | Robinson | June 21, 1955 |
| 2,725,548 | Harris | Nov. 29, 1955 |
| 2,731,419 | Goodman | Jan. 17, 1956 |
| 2,759,134 | Sullivan | Aug. 14, 1956 |

FOREIGN PATENTS

| 403,098 | Great Britain | Dec. 11, 1933 |
| 731,190 | Great Britain | Jan. 17, 1952 |